US012488244B1

(12) United States Patent
Uva

(10) Patent No.: US 12,488,244 B1
(45) Date of Patent: Dec. 2, 2025

(54) APPARATUS AND METHOD FOR DATA GENERATION FOR USER ENGAGEMENT

(71) Applicant: UVA IP, LLC, Miami, FL (US)

(72) Inventor: Luis Uva, Miami, FL (US)

(73) Assignee: UVA IP, LLC, Miami, FL (US)

( * ) Notice: Subject to any disclaimer, the term of this patent is extended or adjusted under 35 U.S.C. 154(b) by 0 days.

(21) Appl. No.: 18/882,311

(22) Filed: Sep. 11, 2024

(51) Int. Cl.
| | |
|---|---|
| G06N 3/08 | (2023.01) |
| G06N 3/09 | (2023.01) |
| G06N 3/091 | (2023.01) |
| G06N 20/00 | (2019.01) |
| H04L 41/5067 | (2022.01) |
| H04L 65/80 | (2022.01) |

(52) U.S. Cl.
CPC ................. *G06N 3/08* (2013.01); *G06N 3/09* (2023.01); *G06N 3/091* (2023.01); *G06N 20/00* (2019.01); *H04L 41/5067* (2013.01); *H04L 65/80* (2013.01)

(58) Field of Classification Search
CPC .......... G06N 3/08; G06N 3/09; G06N 3/091; G06N 20/00; H04L 41/5067; H04L 65/80
See application file for complete search history.

(56) References Cited

U.S. PATENT DOCUMENTS

| | | | |
|---|---|---|---|
| 2011/0137707 A1 | 6/2011 | Winfield et al. | |
| 2015/0127426 A1 | 5/2015 | Chaudhry | |
| 2015/0348090 A1* | 12/2015 | Alsina ................ | G06Q 30/0244 705/14.43 |
| 2017/0212650 A1* | 7/2017 | Sinyagin ................. | G06F 9/453 |
| 2020/0151174 A1* | 5/2020 | Sun ...................... | G06F 16/2379 |
| 2020/0160388 A1* | 5/2020 | Sabeg ................. | G06F 21/6245 |
| 2021/0027184 A1* | 1/2021 | Heuser .................. | G06N 20/00 |
| 2023/0334514 A1* | 10/2023 | Hernandez Rivera ....................... | G06Q 30/0207 |
| 2024/0273563 A1* | 8/2024 | Narayanan ............. | G06Q 10/04 |
| 2024/0281490 A1* | 8/2024 | Goodman Gu ....... | G06F 16/954 |
| 2025/0053674 A1* | 2/2025 | Arriaga ............... | G06F 21/6218 |

FOREIGN PATENT DOCUMENTS

| | | |
|---|---|---|
| CN | 113869930 A | 12/2021 |
| IN | 202311061960 A | 12/2023 |
| KR | 20220074466 A | 6/2022 |
| WO | 2022018505 A1 | 1/2022 |

* cited by examiner

*Primary Examiner* — Michelle T Bechtold
*Assistant Examiner* — Nicholas S Wu
(74) *Attorney, Agent, or Firm* — Caldwell Intellectual Property Law

(57) ABSTRACT

An apparatus and method for data generation for user engagement are disclosed. The apparatus includes an application programming interface, an interactive user interface, at least a processor and a memory communicatively connected to the at least a processor, wherein the memory contains instructions configuring the at least a processor to receive user data from the interactive user interface, identify first user engagement data as a function of the user data, label the first user engagement data to at least an engagement label, generate action data as a function of the first user engagement data containing the at least an engagement label, trigger the action data using the application programming interface, receive second user engagement data as a function of the triggered action data from the interactive user interface and update the action data as a function of the second user engagement data.

18 Claims, 8 Drawing Sheets

APPARATUS AND METHOD FOR DATA GENERATION FOR USER ENGAGEMENT

FIELD OF THE INVENTION

The present invention generally relates to the field of artificial intelligence. In particular, the present invention is directed to an apparatus and method for data generation for user engagement.

BACKGROUND

User data contain comprehensive records pertaining to how users engage with a system and often provide valuable insights for predicting future trajectories and/or informing decision-making processes. However, user data are often distributed across various locations and modalities. Analysis of such unstructured data is therefore challenging.

SUMMARY OF THE DISCLOSURE

In an aspect, an apparatus for data generation for user engagement is disclosed. The apparatus includes an application programming interface (API), an interactive user interface, at least a processor and a memory communicatively connected to the at least a processor, wherein the memory contains instructions configuring the at least a processor to receive user data from the interactive user interface, identify a first user engagement data as a function of the user data, label the first user engagement data to at least an engagement label, generate action data as a function of the first user engagement data containing the at least an engagement label, wherein determining the action data includes generating action training data, wherein the action training data includes exemplary user engagement data correlated to exemplary action data, training an action machine-learning model using the action training data and generating the action data using the trained action machine-learning model, trigger the action data using the API, receive second user engagement data as a function of the triggered action data from the interactive user interface and update the action data as a function of the second user engagement data, wherein updating the action data includes updating the action training data as a function of the second user engagement data and retraining the action machine-learning model as a function of the updated action training data.

In another aspect, a method for data generation for user engagement is disclosed. The method includes receiving, using at least a processor, user data from an interactive user interface, identifying, using the at least a processor, a first user engagement data as a function of the user data, generating, using the at least a processor, action data as a function of the first user engagement data containing the at least an engagement label, wherein determining the action data includes generating action training data, wherein the action training data includes exemplary user engagement data correlated to exemplary action data, training an action machine-learning model using the action training data and generating the action data using the trained action machine-learning model, triggering, using the at least a processor, the action data using an application processing interface (API), receiving, using the at least a processor, second user engagement data as a function of the triggered action data from the user interface and updating, using the at least a processor, the action data as a function of the second user engagement data, wherein updating the action data includes updating the action training data as a function of the second user engagement data and retraining the action machine-learning model as a function of the updated action training data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for data generation for user engagement. The apparatus includes an application programming interface (API), an interactive user interface, at least a processor and a memory communicatively connected to the at least a processor, wherein the memory contains instructions configuring the at least a processor to receive user data from the interactive user interface, identify a first user engagement data as a function of the user data, label the first user engagement data to at least an engagement label, generate action data as a function of the first user engagement data containing the at least an engagement label, wherein determining the action data includes generating action training data, wherein the action training data includes exemplary user engagement data correlated to exemplary action data, training an action machine-learning model using the action training data and generating the action data using the trained action machine-learning model, trigger the action data using the API, receive second user engagement data as a function of the triggered action data from the interactive user interface and update the action data as a function of the second user engagement data, wherein updating the action data includes updating the action training data as a function of the second user engagement data and retraining the action machine-learning model as a function of the updated action training data. Exemplary embodiments illustrating aspects of the present disclosure are described below in the context of several specific examples.

Figure 1:
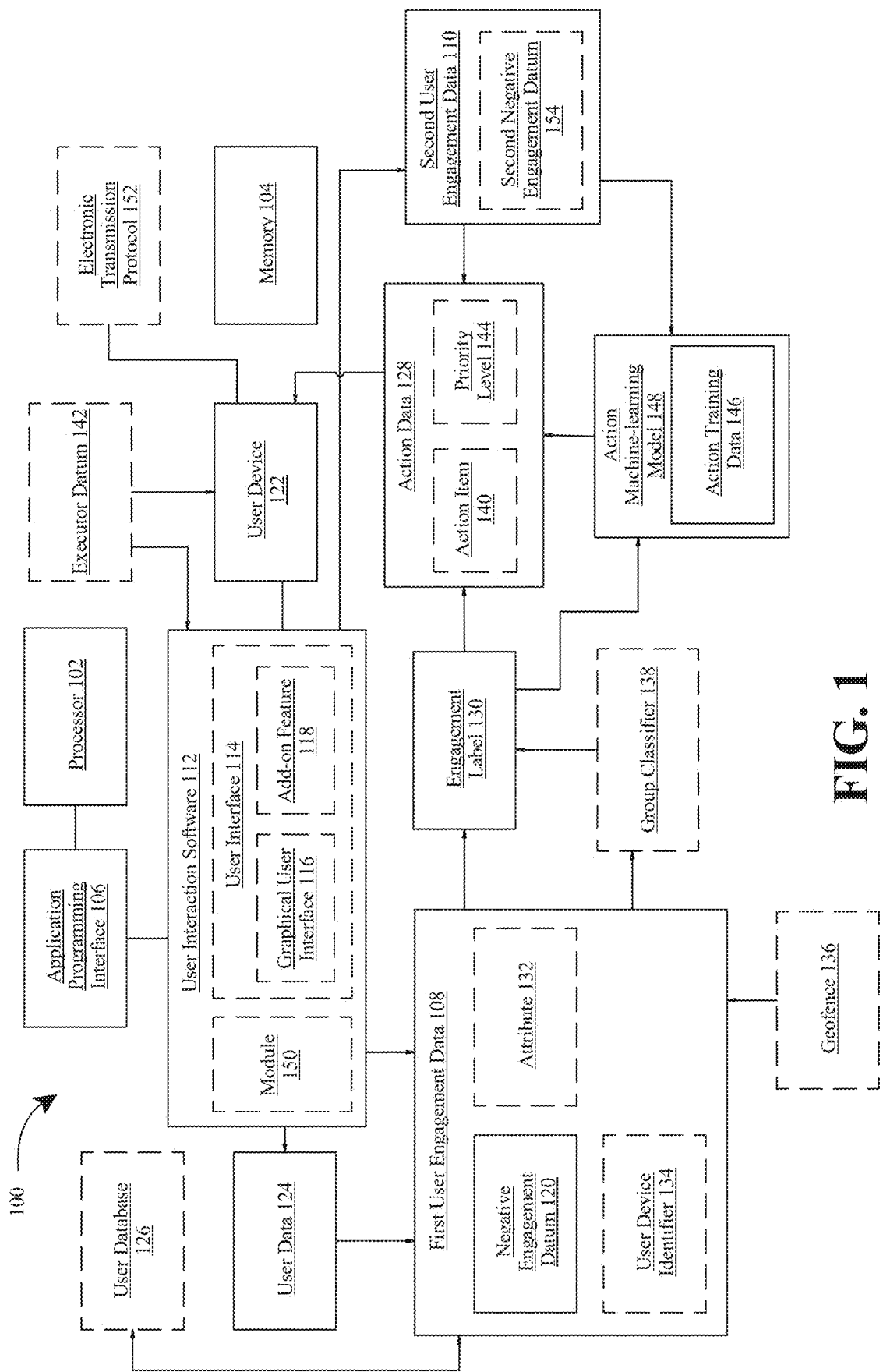
FIG. 1 illustrates a block diagram of an exemplary apparatus for data generation for user engagement.

Referring now to FIG. 1, an exemplary embodiment of an apparatus 100 for data generation for user engagement is illustrated. Apparatus 100 includes at least a processor 102. Processor 102 may include, without limitation, any processor described in this disclosure. Processor 102 may be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 104 communicatively connected to processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, apparatus 100 includes an application programming interface (API) 106. As used in the current disclosure, an "application programming interface" is a software interface for two or more computer programs to communicate with each other. As a non-limiting example, API 106 may include web APIs, operating system APIs, and the like. As a non-limiting example, API 106 may include An application programming interface 106 may be a type of software interface, offering a service to other pieces of software. In contrast to a user interface, which connects a computer to a person, an application programming interface 106 may connect computers or pieces of software to each other. An API 106 may not be intended to be used directly by a person (e.g., the end user) other than a computer programmer who is incorporating it into the software. An API 106 may be made up of different parts which act as tools or services that are available to the programmer. A program or a programmer that uses one of these parts is said to call that portion of the API 106. The calls that make up the API 106 are also known as subroutines, methods, requests, or endpoints. An API specification may define these calls, meaning that it explains how to use or implement them. One purpose of API 106 may be to hide the internal details of how a system works, exposing only those parts a programmer will find useful and keeping them consistent even if the internal details later change. An API 106 may be custom-built for a particular pair of systems, or it may be a shared standard allowing interoperability among many systems. The term API 106 may be often used to refer to web APIs, which allow communication between computers that are joined by the internet. API 106 may be configured to query for web applications in order to retrieve first user engagement data 108 or second user engagement data 110 to another web application, database, interactive user interface 112, processor 102, and the like. An API 106 may be further configured to filter through web applications according to a filter criterion. In this disclosure, "filter criteria" are conditions the web applications must fulfill in order to qualify for API. Web applications may be filtered based on these filter criteria. Filter criteria may include, without limitation, types of interactive user interface, location of the interactive user interface, location of point-of-sale terminals, and the like.

With continued reference to FIG. 1, apparatus 100 includes an interactive user interface 112. For the purposes of this disclosure, an "interactive user interface" is a system component that facilitates and manages how users engage with a software platform. As a non-limiting example, interactive user interface 112 may include a software platform designed for managing customer relationships and business processes. For example, and without limitation, interactive user interface 112 may include a customer relationship management software. Interactive user interface 112 includes a user interface (UI) 114. For the purposes of this disclosure, a "user interface" is a means by which a user and a computer system interact; for example through the use of input devices and software. A user interface 114 may include a graphical user interface (GUI) 116, command line interface (CLI), menu-driven user interface, touch user interface, voice user interface (VUI), form-based user interface, any combination thereof and the like. In some embodiments, user interface 114 may operate on and/or be communicatively connected to a decentralized platform, metaverse, and/or a decentralized exchange platform associated with the user. For example, a user may interact with user interface in virtual reality. In some embodiments, a user may interact with the user interface 114 using a computing device distinct from and communicatively connected to at least a processor 102. For example, a smart phone, smart, tablet, or laptop operated by a user.

With continued reference to FIG. 1, in some embodiments, UI 114 may include a physical user interface. Physical user interfaces may include hardware components such as keyboards, mice, touchscreens, buttons, or any other tangible controls that allow users to interact directly with a device. For example, the buttons next to a point-of-sale (POS) or the touchpad on a laptop can be both physical user interfaces. These elements translate user's actions into commands (e.g., first user engagement data 108) that processor 102 can process. The first user engagement data 108 is further described below.

With continued reference to FIG. 1, in some embodiments, UI 114 may include a software-based user interface. As a non-limiting example, software-based user interface may include visual and interactive elements within a software application, such as menus, icons, dialog boxes, and input fields. Software UIs may be designed to facilitate user interaction with the underlying software functions. For example, user interface 114 may include a graphical user interface 116. A "graphical user interface," as used herein, is a graphical form of user interface that allows users to interact with electronic devices. In some embodiments, GUI 116 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, UI 114 may include an add-on feature 118. An "add-on" for the purposes of this disclosure is a feature allowing a device or a software to be added to an already existing device or software. The add-on may provide for enhanced features and/or added features. Apparatus 100 may be configured as an add-on for an existing design program wherein a user may interact with apparatus without having to leave the current software program. As a non-limiting example, apparatus 100 may be configured as an add on for a customer relationship management (CRM), wherein user may interact with apparatus 100 within the software. The user may receive first user engagement data 108 or second user engagement data 110 within the software. The second user engagement data 110 is further described below. Apparatus 100 may receive first user engagement data 108 or second user engagement data 110 in a format similar to the format that first user engagement data 108 is being generated within the software. Add-on feature 118 may include additional interface components or enhancements that can be integrated into an existing system to improve user experience or functionality. For example, a web browser might offer a toolbar as an add-on feature 118, providing users with quick access to specific tools or functions that were not originally part of the core UI. In some cases, processor 102 may receive first user engagement data 108 or second user engagement data 110 through an add-on feature 118 of another program. For example, processor 102 may automatically receive first user engagement data 108 or second user engagement data 110 based on a user's interaction with the software. In some cases, user may interact with a feature within the software program to submit first user engagement data 108 or second user engagement data 110 to processor 102.

With continued reference to FIG. 1, in some embodiments, UI 114 may serve as a data source for collecting information related to user engagement, behavior, or engagement. By tracking how users interact with user interface 114—such as which buttons they click, how much time they spend on certain pages, or how they navigate through a software application-first user engagement data 108 or second user engagement data 110 may be obtained; user preferences, positive engagements, and pain points (e.g., negative engagement datum 120). For the purposes of this disclosure, a "negative engagement datum" is a data element related to user's engagement or expression that indicates dissatisfaction, criticism, or disapproval of a product, service, or experience. The negative engagement datum 120 disclosed herein is further described below.

With continued reference to FIG. 1, in some embodiments, user interface 114 may be integrated in a user device 122. For the purposes of this disclosure, a "user device" is any device a user uses to input data, where the data may include user engagement data. In an embodiment, the user device 122 may include a personal device. For the purposes of this disclosure, a "personal device" is any device personally owned by a user. As a non-limiting example, the personal device may include a laptop, tablet, mobile phone, smart watch, or things of the like. In some embodiments, user device 122 may include an interface configured to receive inputs from the user. The inputs may include personal information, user engagement data (e.g., first user engagement data 108, second user engagement data 110, and the like) described in the disclosure. In some embodiments, a user may have a capability to process, store or transmit any information independently. In another embodiment, user device 122 may include a shared device. For the purposes of this disclosure, a "shared device" is a device that is designed for use by multiple users. In some embodiments, the shared device may be used by different users at different times. As a non-limiting example, the shared devices may include desktop computers, kiosks, screens, tablets, or the like.

With continued reference to FIG. 1, memory 104 contains instructions configuring processor 102 to receive user data 124. For the purposes of this disclosure, "user data" is any data related to a user. For the purposes of this disclosure, a "user" is any person or individual that is using or has used an apparatus. As a non-limiting example, a user may include a customer at POS terminal, client, and the like. In some embodiments, user data 124 may include personal information. As a non-limiting example, personal information may include name, gender, date of birth, residency, religion, occupation, family, contact information, emergency contact, and the like. In some embodiments, user data 124 may include geolocation of a user device 122 or user. A "geolocation," as used in this disclosure, is any global position system (GPS) of a device or a user. In some embodiments, geolocation may be identified using a description of the latitude and/or longitude of a position where user device 122 is located. In a non-limiting example, geolocation may be obtained based on an input received from user device 122.

With continued reference to FIG. 1, memory 104 contains instructions configuring processor 102 to identify a first user engagement data 108 as a function of user data 124. In some embodiments, processor 102 may identify first user engagement data 108 through the use of language processing module, engagement machine-learning model, and the like. In some embodiments, user may manually identify first user engagement data 108. For the purposes of this disclosure, "first user engagement data" is data related user's assessment, reaction or emotion to experience or data provided to the user. In some embodiments, first user engagement data 108 may include explicit engagement. For the purposes of this disclosure, "explicit engagement" is user's assessment and reaction that is direct and in a clear manner. As a non-limiting example, explicit engagement may include numerical ratings, scores, comments, suggestions, reviews, answers of questionnaire or survey, discussions, complains through the phone call, messages from chatbot or internal communication tool, or the like. In some embodiments, first user engagement data 108 may include implicit engagement. For the purposes of this disclosure, "implicit engagement" is user's assessment and reaction that indirectly inferred from user's behavior, actions, or interactions. As a non-limiting example, implicit engagement may include user's behavior such as but not limited to clicks, views, purchase histories, dwell time, search queries, browsing histories, frequencies of actions, or interactions with contents. In some embodiments, processor 102 may be configured to analyze implicit engagement. As a non-limiting example, processor 102 may analyze implicit engagement to determine data patterns, trends, or anomalies using statistical methods, data mining techniques, machine-learning algorithms, sentiment analysis, web crawler, or the like. In a non-limiting example, user may manually input first user engagement data 108 through user interface 114. For example, and without limitation, user may input negative feedback (negative engagement datum 120) by pushing a red button (user interface 114). In another non-limiting example, user may manually input first user engagement data 108 by clicking an angry face graphical user interface (GUI) element on a screen at point-on-sale (user interface 114).

With continued reference to FIG. 1, in some embodiments, processor 102 may use a language processing module to find first user engagement data 108. The language processing module may be configured to extract, from user data 124, one or more words related to first user engagement data 108. One or more words may include, without limitation, strings of one or more characters, including without limitation any sequence or sequences of letters, numbers, punctuation, diacritic marks, spaces, whitespace, and other symbols, including any symbols usable as textual data. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by processor 102 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module may then use such associations to analyze words extracted from one or more documents and determine that the one or more documents indicate significance of a category. In an embodiment, language module and/or processor 102 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 102. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor XXX may automatically obtain the document using such an identifier, for instance by submitting a request to a database or compendium of documents such as JSTOR as provided by Ithaka Harbors, Inc. of New York.

With continued reference to FIG. 1, in some embodiments, apparatus 100 may include a user database 126. As used in this disclosure, "user database" is a data structure configured to store data associated with a user and the user's engagement. As a non-limiting example, user database 126 may store user data 124, first user engagement data 108, negative engagement datum 120, second user engagement data 110, action data 128, engagement label 130, any training data, any inputs and outputs of any machine-learning models disclosed in this disclosure, and the like. In one or more embodiments, user database 126 may include inputted or calculated information and datum related to a user. In some embodiments, a datum history may be stored in user database 126. As a non-limiting example, the datum history may include real-time and/or previous inputted data related to user. As a non-limiting example, user database 126 may include instructions from a user, who may be an expert user, a past user in embodiments disclosed herein, or the like, where the instructions may include examples of the data related to user.

With continued reference to FIG. 1, in some embodiments, processor 102 may be communicatively connected with user database 126. For example, and without limitation, in some cases, user database 126 may be local to processor 102. In another example, and without limitation, user database 126 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store user database 126. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, user database 126 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, processor 102 may be configured to extract a negative engagement datum 120 as a function of first user engagement data 108. In some embodiments, processor 102 may extract first user engagement data 108 as a function of user data 124. As a non-limiting example, negative engagement datum 120 may include a user pressing a red button, indicating negative feedback, or selecting an "angry face" graphical user interface (GUI) element on a screen, such as at a point-of-sale terminal. As another non-limiting example, negative engagement datum 120 may include a user expressing complain related to a specific product to a personnel. In some embodiments, processor 102 may be configured to extract a negative engagement datum 120 from first user engagement data 108 as a function of at least an attribute 132 of the first user engagement data 108. In some embodiments, processor 102 may be configured to extract a first user engagement data 108 from user data 124 as a function of at least an attribute 132 of user data 124. For the purposes of this disclosure, an "attribute" refers to a specific characteristic, property, or quality. As a non-limiting example, attribute 132 of user data 124 may include keyword, pattern, or characteristic retrieved using optical character recognition, audio speech recognition, audiovisual speech recognition, machine-learning model, natural language processing (NLP) techniques, sentiment analysis algorithms, language processing module, and the like as described below. As another non-limiting example, attribute 132 of first user engagement data 108 may include context or environment in which the engagement occurred, such as the specific device used (e.g., mobile, desktop), the location data if available, or the particular section of the application or website where the interaction took place. Another example may include the frequency and recency of similar engagement patterns by the same user or across a broader user base, providing insights into user behavior trends over time.

With continued reference to FIG. 1, for the purposes of this disclosure, "optical character recognition" is a technology that enables the recognition and conversion of printed or written text into machine-encoded text. In some cases, processor 102 may be configured to recognize a keyword, phrase, semantic feature, or the like using OCR to find negative engagement datum 120 or attribute 132. In some cases, processor 102 may transcribe much or even substantially all first user engagement data 108. As a non-limiting example, processor 102 may analyze a user's review related to a product using OCR.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from first user engagement data 108 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of first user engagement data 108. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the first user engagement data 108 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described in the entirety of this disclosure and/or with reference to FIG. 4. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes first user engagement data 108. Since the adaptive classifier may have learned something useful a little too late to recognize characters on the first pass, a second pass may be run over the first user engagement data 108. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, processor 102 may include audiovisual speech recognition (AVSR) processes to recognize keywords, phrase, semantic pattern, or the like of first user engagement data 108. For example, processor 102 may use image or video of first user engagement data 108 to aid in recognition of audible verbal content such as viewing user move their lips to speak on video to process the audio content of first user engagement data 108. AVSR may use image or video of first user engagement data 108 to aid the overall translation of the audio verbal content. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal, visual data, or the like of first user engagement data 108. For instance, audio vector and image vector may each be concatenated and used to predict speech made by a user, who is 'on camera.'

With continued reference to FIG. 1, in some embodiments, processor 102 may obtain document using automatic speech recognition (ASR). As a non-limiting example, ASR may analyze a record of a call or radio communication to obtain call record or radio record. For the purposes of this disclosure, "automatic speech recognition" is a technology that converts spoken language into written text or machine-readable form. In a non-limiting example, processor 102 may use a record of a call or radio communication to aid in recognition of first user engagement data 108. In some embodiments, ASR may include techniques employing language processing to aid speech recognition processes. In some cases, ASR may be used to decode (i.e., recognize) indeterministic phonemes or help in forming a preponderance among probabilistic candidates. In some cases, ASR may include an audio-based automatic speech recognition process and an image-based automatic speech recognition process. ASR may analysis audio according to any method described herein, for instance using a Mel frequency cepstral coefficients (MFCCs) and/or log-Mel spectrogram derived from raw audio samples. In some cases, feature recognition may include any feature recognition process described in this disclosure, for example a variant of a convolutional neural network. In some cases, ASR employs an audio datum to recognize first user engagement data 108. For instance, audio vector may each be concatenated and used to predict speech made by user.

With continued reference to FIG. 1, in some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by processor 102. Processor 102 may then train an automatic speech recognition model according to training data which includes audible verbal content correlated to known content. In this way, processor 102 may analyze a person's specific voice and train an automatic speech recognition model to the person's speech, resulting in increased accuracy. Alternatively or additionally, in some cases, processor 102 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

With continued reference to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 102 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include user. For example, user may speak within solicitation video, but others may speak as well.

With continued reference to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

With continued reference to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

With continued reference to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

With continued reference to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

With continued reference to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

With continued reference to FIG. 1, in some embodiments, speech (i.e., audible verbal content) decoding may include considering a set of good feedback and not only a best feedback, when presented with a new utterance. In some cases, a better scoring function (i.e., re-scoring) may be used to rate each of a set of good feedback, allowing selection of a best feedback according to this refined score. In some cases, a set of feedback can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of feedback may be pruned to maintain tractability.

With continued reference to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow processor 102 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

With continued reference to FIG. 1, in some embodiments, an automatic speech recognition process may include a neural network. Neural network may include any neural network, for example those disclosed with reference to FIGS. 4-6. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, in some embodiments, processor 102 may be configured to analyze first user engagement data 108 to determine a label of first user engagement data 108. For the purposes of this disclosure, a "label of first user engagement data," also called "first user engagement label" is a descriptive information of first user engagement data based on specific attributes, sentiments, or criteria. In some embodiments, label of first user engagement data 108 may represent sentiments of first user engagement data 108. As a non-limiting example, label of first user engagement data 108 may include positive, negative, neutral, or the like. In some embodiments, label of first user engagement data 108 may categorize first user engagement data 108. In some embodiments, label of first user engagement data 108 may be stored in user database 126. In some embodiments, label of first user engagement data 108 may be retrieved from user database 126. In some embodiments, label of first user engagement data 108 may be manually inputted by a user. In some embodiments, processor 102 may implement fuzzy set as described in detail with respect to FIG. 8.

With continued reference to FIG. 1, in some embodiments, processor 102 may be configured to analyze first user engagement data 108 using an engagement machine-learning model. For the purposes of this disclosure, an "engagement machine-learning model" is a machine-learning model that determines a label of first user engagement data. In some embodiments, engagement machine-learning model may be consistent with any machine-learning model described with respect to FIG. 4. In some embodiments, processor 102 may be configured to generate or obtain engagement training data. In some embodiments, processor 102 may be configured to train engagement machine-learning model using engagement training data and determine label of first user engagement data 108 using the trained machine-learning model. For the purposes of this disclosure, "engagement training data" is training data that is used to train an engagement machine-learning model. In some embodiments, engagement training data may be consistent with training data described with respect to FIG. 4. In some embodiments, engagement training data may include correlations between exemplary first user engagement data or exemplary user data and exemplary labels of first user engagement data. As a non-limiting example, engagement machine-learning model trained with engagement training data may output 'negative" as label of first user engagement data 108 for inputted first user engagement data 108 and data element of the first user engagement data 108 with negative label may be considered as negative engagement datum 120. In some embodiments, engagement training data may be received from one or more users, user database 126, external computing devices, and/or previous iterations of processing. As a non-limiting example, engagement training data may include instructions from a user, who may be an expert user, a past user in embodiments disclosed herein, or the like, which may be stored in memory and/or stored in user database 126, where the instructions may include labeling of training examples. In some embodiments, engagement training data may be updated iteratively through a feedback loop. As a non-limiting example, engagement training data may be updated iteratively through a feedback loop as a function of newly collected first user engagement data 108, second user engagement data 110, or the like.

With continued reference to FIG. 1, memory 104 contains instructions configuring processor 102 to label first user engagement data 108 to at least an engagement label 130. For the purposes of this disclosure, an "engagement label" is a label of data that is categorized and determined based on shared characteristics, themes, or underlying issues. As a non-limiting example, engagement label 130 may include first user engagement data 108 or negative engagement datum 120 related to specific product features, such as usability issues, design flaws, or performance problems. These engagement labels 130 may be organized based on common themes or patterns (attribute 132) identified in the first user engagement data 108 or negative engagement data 120, such as recurring complaints about a particular aspect of the product or service. Another non-limiting example of an engagement label 130 may involve categorization based on the source or medium of the user engagement, such as grouping all first user engagement data 108 or negative engagement data 120 received through customer support channels like phone calls or chatbots, or through digital platforms such as online reviews or social media comments. Engagement labels 130 may also be formed based on the severity or impact of the user engagement, allowing for prioritization of issues that are most critical to user satisfaction and product improvement. As an additional non-limiting example, engagement label 130 may be formed by extracting a user device identifier 134 from first user engagement data 108 and classifying first user engagement data 108 or negative engagement datum 120 into at least an engagement label 130 as a function of the user device identifier 134. This can allow for the identification and analysis of negative user engagement patterns associated with specific devices or device types. This method enhances the ability to address device-specific issues or user-specific issues that may be contributing to negative user experiences. These engagement labels 130 may enable processor 102 to systematically analyze and address first user engagement data 108 or negative engagement datum 120 by identifying specific areas that require attention, facilitating targeted improvements and more effective responses to user concerns. In some embodiments, engagement label 130 may be stored in user database 126. In some embodiments, processor 102 may retrieve engagement label 130 from user database 126. In some embodiments, user may classify first user engagement data 108 or negative engagement datum 120 to engagement label 130.

With continued reference to FIG. 1, for the purposes of this disclosure, a "user device identifier" is an identifier that is unique for a user device among others. As a non-limiting example, user device identifier 134 may include a cryptographic hashes, primary key, a unique sequencing of alphanumeric symbols, or anything of the like that can be used to identify user device 122, user interface 114 or the source of user engagement data (e.g., first user engagement data 108 or second user engagement data 110). User device identifier 134 may be used to distinctly recognize each user device 122 within the system, enabling precise tracking, classification, and analysis of first user engagement data 108 or second user engagement data 110 associated with that specific device. Processor 102 may classify first user engagement data 108 or negative engagement datum 120 into at least an engagement label 130 as a function of user device identifier 134. In a non-limiting example, each engagement label 130 may correspond to different company departments, such as technical, human resources, and the like. Negative engagement datum 120 or first user engagement data 108 may then be classified into the engagement label 130 that is associated with the specific department. For instance, if negative engagement datum 120 includes a user device identifier 134 that is related to a technical department of a company, it would be classified into the engagement label 130 associated with the technical department. In another non-limiting example, if user device identifier 134 is associated with a device commonly used by the human resources department, any corresponding negative engagement data 120 would be classified into the engagement label 130 linked to the human resources department. This classification enables the appropriate department to promptly receive and address the feedback (first user engagement data 108 or negative engagement datum 120), ensuring that the concerns are handled by the most relevant team, thereby improving the efficiency and effectiveness of the company's response to negative engagement.

With continued reference to FIG. 1, in some embodiments, first user engagement data 108 or negative engagement datum 120 may include identifying geolocation of the first user engagement data 108 using a geofence and classifying first user engagement data 108 or negative engagement datum 120 into at least an engagement label 130 as a function of the geolocation. In one or more embodiments, receiving first user engagement data 108 may include aggregating the first user engagement data 108 associated with a plurality of users, wherein each user of the plurality of users is associated with a geographical location (geolocation). Such geographical location may pertain to a location from which an inquiry, order, purchase, or the like is placed, a location from which a phone call, video conferencing, or the like is initiated, a location to which a letter, invoice, shipment, or parcel is mailed or shipped to, among others. A geographical location may include or pertain to a specific address, a street name, a neighborhood name, a county name, a city name, a jurisdiction, a state, a country, and/or a continent. A geographical location may include or pertain to a zip code or area code. A geographical location may be specified by a combination of longitude and latitude. Accordingly, in such embodiments, processor 102 may be configured to categorize or filter first user engagement data 108, using a geofence 136, as a function of user's geographical location. In some cases, certain inclusion/exclusion criteria may be applied to a plurality of users and/or first user engagement data 108 to selectively isolate the portion thereof within geofence 136. Such processing steps may provide insights regarding where users are distributed across different geographical locations and/or help identify existing or potential markets to target. Such processing steps may also enable a more accurate analysis regarding first user engagement data 108 in a specified location or area. For purposes of this disclosure, a "geofence" or "geofenced area" is a virtual perimeter or boundary defined by geographic coordinates in a digital mapping system. Geographical coordinates may include a radius from a geographical point, proximity to a landmark, zip codes, area codes, longitude and latitude, cities, states, countries, counties, travel time, and/or the like, consistent with details described above. A geofence may be generated as a radius around a point or location (e.g., a detected location of user based on an associated IP address) or using arbitrary borders drawn by user (e.g., the borders a neighborhood). In some embodiments, the point or location may be explicitly or implicitly provided by a user, during their interaction with apparatus 100, through one or more secondary inputs, which may include, as nonlimiting examples, tapping on a screen, inputting an address, inputting coordinates, and/or the like. Geofences may be generated to match a predetermined set of boundaries such as neighborhoods, school zones, zip codes, county, state, and city limits, area codes, voting districts, geographic regions, streets, rivers, other landmarks, and/or the like. In one or more embodiments, a geofence may be generated as a function of first user engagement data 108 using one or more addresses detected therein. Geofences may be used in location-based services and applications to trigger specific actions or events when a mobile device or GPS-enabled object enters, exits, or remains within a designated area. Additional disclosure related to geofence 136 and analyzing data may be found in Non-provisional application Ser. No. 18/882,108 filed on Sep. 11, 2024, and entitled "APPARATUS AND METHODS FOR PREDICTING AN OUTCOME OF USER ENGAGEMENT," the entirety of which is incorporated herein by reference.

With continued reference to FIG. 1, in some embodiments, processor 102 may be configured to generate group training data. For the purposes of this disclosure, "group training data" is data that is used to train a group classifier. In a non-limiting example, group training data may include correlations between exemplary first user engagement data or negative engagement data correlated to exemplary engagement labels. In a non-limiting example, group training data may include correlations between exemplary first user engagement data, exemplary geolocations, exemplary first user engagement data or negative engagement data, exemplary user device identifiers and/or exemplary attributes correlated to exemplary engagement labels. In some embodiments, group training data may be stored in user database 126. In some embodiments, group training data may be received from one or more users, user database 126, external computing devices, and/or previous iterations of processing. As a non-limiting example, group training data may include instructions from a user, who may be an expert user, a past user in embodiments disclosed herein, or the like, which may be stored in memory and/or stored in user database 126, where the instructions may include labeling of training examples. In some embodiments, group training data may be updated iteratively on a feedback loop. As a non-limiting example, processor 102 may update group training data iteratively through a feedback loop as a function of first user engagement data 108, second user engagement data 110, negative engagement datum 120, attribute 132, input and/or output of any machine-learning models disclosed in this disclosure, (e.g., engagement machine-learning model, cohort classifier, and the like), or the like. In some embodiments, processor 102 may be configured to generate group classifier 138. For the purposes of this disclosure, a "group classifier" is a classifier that classifies first user engagement data or a negative engagement datum into at least an engagement label. In a non-limiting example, generating group classifier 138 may include training, retraining, or fine-tuning group classifier 138 using group training data or updated group training data. In some embodiments, processor 102 may be configured to classify first user engagement data 108 or negative engagement datum 120 into at least an engagement label 130 using group classifier 138 (i.e. trained or updated group classifier 138). In some embodiments, user or first user engagement data 108 may be classified to a user cohort using a cohort classifier. Cohort classifier may be consistent with any classifier discussed in this disclosure. Cohort classifier may be trained on cohort training data, wherein the cohort training data may include first user engagement data 108 correlated to user cohorts. In some embodiments, a user may be classified to a user cohort and processor 102 may classify first user engagement data 108 or negative engagement datum 120 into engagement labels 130 based on the user cohort using a machine-learning module as described in detail with respect to FIG. 4 and the resulting output may be used to update group training data. In some embodiments, generating training data and training machine-learning models may be simultaneous.

With continued reference to FIG. 1, memory 104 contains instructions configuring processor 102 to generate action data 128 as a function of first user engagement data 108 containing at least an engagement label 130. For the purposes of this disclosure, "action data" is data related to a set of instructions, tasks, actions or guidelines to rectify first user engagement data. Action data 128 may include specific instructions on what needs to be done to address the issue (negative engagement datum 120). As a non-limiting example, action data 128 may be tailored to the type of problem, the urgency, and the resources available within the organization indicated by at least an engagement label 130. As a non-limiting example, action data 128 may include any actions or tasks that can be executed by interactive user interface 112. As a non-limiting example, action data 128 may include assignments of action items 140 to relevant personnel or departments. For example, and without limitation, if negative engagement datum 120 may be related to a software bug, the action data 128 might direct the issue to the IT department (executor datum 142) with instructions to diagnose and fix the problem. For example, and without limitation, action data 128 may include "fix software malfunction," "send targeted email," "improve purchasing experience," or the like. In a non-limiting example, if a customer (user) had a negative emotion toward a specific product or service (negative engagement datum 120), processor 102 may automatically send the customer an email apologizing and rectifying the experience (action data 128). In some embodiments, action data 128 may be stored in user database 126. In some embodiments, processor 102 may retrieve action data 128 from user database 126. In some embodiments, user may manually determine action data 128.

With continued reference to FIG. 1, in some embodiments, determining action data 128 may include determining a list of action items 140 of action data 128 and determining a priority level 144 of each action item 140 of the list of action items 140. For the purposes of this disclosure, an "action item" is a specific, discrete task or step that needs to be completed as part of a broader plan. For the purposes of this disclosure, a "priority level" is a classification or ranking assigned to a task, issue, or action item that indicates its relative importance and urgency compared to other tasks or issues. In some embodiments, processor 102 may identify and compile a list of specific tasks or steps (action items 140) that need to be taken to address the issues highlighted by first user engagement data 108 or the negative engagement datum 120. These action items 140 may be derived from the analysis of first user engagement data 108 or the negative engagement datum 120 and may be intended to directly resolve, mitigate, or further investigate the problems identified. For example, if negative engagement datum 120 pertains to a software malfunction, the list of action items 140 might include tasks such as "investigate the root cause of the error," "apply necessary software patches," and "conduct user testing to confirm resolution." For example, if action data 128 includes improving user satisfaction with a customer service department, action item 140 may include areas such as response time, communication quality, and resolution effectiveness. In some embodiments, processor 102 may retrieve action item 140 from a database that stores a list of action items 140 for action data 128 as a function of action data 128. In a non-limiting example, processor 102 may use action data 128 or portion of action data 128 as a keyword to retrieve associated action item 140 from the database. In some embodiments, action item 140 may be determined through the use of machine-learning model or a user may manually determine action item 140. In some embodiments, processor 102 may assign a priority level 144 to each action item 140 of action data 128, ensuring that critical issues are addressed before less urgent ones. Priority levels 144 may be based on factors such as the severity of the issue, the potential impact on users, the likelihood of recurrence, and the resources available for resolution. For instance, a critical security vulnerability might be assigned a high priority, necessitating immediate action, while a minor UI inconsistency might be given a lower priority. In some embodiments, processor 102 may determine priority level 144 using a set of instructions or predetermined rule associated with priority level 144 that may be retrieved from a database (user database 126) or inputted by a user. In some embodiments, the set of instructions or predetermined rule may be previously used instructions or rules. Priority level 144 may be determined through the use of machine-learning model or a user may manually determine priority level 144 of first user engagement data 108 or negative engagement datum 120.

With continued reference to FIG. 1, in some embodiments, processor 102 may be configured to generate action training data 146. For the purposes of this disclosure, "action training data" is data that is used to train an action machine-learning model. Action training data 146 includes exemplary first user engagement data or exemplary negative engagement data correlated to exemplary action data. In a non-limiting example, action training data 146 may include exemplary first user engagement data, exemplary geolocations, exemplary negative engagement data, exemplary second user engagement data, exemplary user device identifiers and/or exemplary attributes correlated to exemplary action data. In some embodiments, action training data 146 may be stored in user database 126. In some embodiments, action training data 146 may be received from one or more users, user database 126, external computing devices, and/or previous iterations of processing. As a non-limiting example, action training data 146 may include instructions from a user, who may be an expert user, a past user in embodiments disclosed herein, or the like, which may be stored in memory and/or stored in user database 126, where the instructions may include labeling of training examples. In some embodiments, action training data 146 may be updated iteratively on a feedback loop. As a non-limiting example, processor 102 may update action training data 146 iteratively through a feedback loop as a function of first user engagement data 108, second user engagement data 110, negative engagement datum 120, attribute 132, previously used action data 128, input and/or output of any machine-learning models disclosed in this disclosure, (e.g., engagement machine-learning model, cohort classifier, and the like), or the like. In some embodiments, processor 102 may be configured to generate action machine-learning model 148. For the purposes of this disclosure, a "action machine-learning model" is a classifier that determines action data. In a non-limiting example, generating action machine-learning model 148 may include training, retraining, or fine-tuning action machine-learning model 148 using action training data 146 or updated action training data 146. Processor 102 is configured to determine action data 128 using action machine-learning model 148 (i.e. trained or updated action machine-learning model 148). In some embodiments, user or first user engagement data 108 may be classified to a user cohort using a cohort classifier. Cohort classifier may be consistent with any classifier discussed in this disclosure. Cohort classifier may be trained on cohort training data, wherein the cohort training data may include first user engagement data 108 correlated to user cohorts. In some embodiments, a user may be classified to a user cohort and processor 102 may determine action data 128 based on the user cohort using a machine-learning module as described in detail with respect to FIG. 4 and the resulting output may be used to update action training data 146. In some embodiments, generating training data and training machine-learning models may be simultaneous.

With continued reference to FIG. 1, memory 104 contains instructions configuring processor 102 to trigger action data 128 using API 106. In a non-limiting example, processor 102 may activate or trigger interactive user interface 112, using API 106, to execute action data 128. In some embodiments, triggering action data 128 may include triggering different modules 150 of the interactive user interface 112 based on at least an engagement label 130 using API 106. For the purposes of this disclosure, a "module" is a self-contained component within an interactive user interface. In some embodiments, module 150 may be responsible for managing specific aspects of executing action data 128 with the interactive user interface 112. As a non-limiting example, examples of modules 150 within CRM software (interactive user interface 112) may include customer support module, sales module, feedback analysis module, marketing module, and the like. For instance, if the negative engagement datum 120 is classified into a "Product Quality" engagement label, the API 106 or processor 102 might trigger the customer support module of interactive user interface 112 to open a support ticket or notify the product development team to address the issue (e.g., executing action data 128).

With continued reference to FIG. 1, processor 102 may transmit action data 128 to at least a user device 122. In some embodiments, transmitting action data 128 may include transmitting a graphical user interface of user interface 114 to at least a user device 122 using an electronic transmission protocol 152. For the purposes of this disclosure, an "electronic transmission protocol" is a set of standardized rules or procedures that govern how data is transmitted between devices over a network. In some embodiments, processor 102 may communicate with user device 122 and/or one or more additional devices as described in further detail below using packet-based communication protocols such as without limitation transfer control protocol-internet protocol (TCIP), hypertext transfer protocol (HTTP), secure HTTP (HTTPS), file transfer protocol (FTP), or the like. Network communication may be performed over any network, according to any protocol that may occur to a person skilled in the art upon reviewing the entirety of this disclosure.

With continued reference to FIG. 1, transmitting action data 128 may include determining an executor datum 142 as a function of action data 128 and first user engagement data 108 and transmitting the action data 128 to at least a user device 122 as a function of the executor datum 142. In some embodiments, triggering interactive user interface 112 may include determining executor datum 142 and executing action data 128 at module 150 of interactive user interface 112 based on executor datum 142. For the purposes of this disclosure, an "executor datum" is a data element or identifier that specifies a person, team, or specific entity responsible for executing an action item or action data. In some embodiments, processor 102 may match action item 140 or action data 128 with the appropriate users or teams based on their expertise, role within the organization, availability, or past performance. For example, if an action item 140 involves debugging a software issue, the executor datum 142 might be the identifier or user device identifier 134 for the software development team or a specific engineer skilled in that area. Once executor datum 142 has been determined for each action item 140 or action data 128, processor 102 transmit the relevant action data 128 or action item 140 to the appropriate user device 122 as a function of executor datum 142. This transmission may ensure that the assigned person, team, or executor receives the instructions or tasks directly on their designated device, such as a computer, smartphone, or any other device connected to the system. The transmission may be tailored based on the executor datum 142, ensuring that the right individuals receive the right task, enabling them to take the necessary actions.

With continued reference to FIG. 1, memory 104 contains instructions configuring processor 102 to receive second user engagement data 110 as a function of triggered action data 128 from user interface 114. For the purposes of this disclosure, "second user engagement data" is related a user's assessment and reaction to data provided to the user after action data is transmitted or executed. In some embodiments, second user engagement data 110 may be consistent with first user engagement data 108. As a non-limiting example, second user engagement data 110 may include implicit engagement and explicit engagement and processor 102 may process second user engagement data 110 as the processor 102 processes first user engagement data 108. Additionally, second user engagement data 110 may include various forms of user input, such as responses to prompts, selections of options, completion of tasks, additional feedback, or any other interaction that the user makes with the interface. For example, second user engagement data 110 may include a survey of how a user like a specific product, service, purchase or experience after action data 128 is executed or completed. In some embodiments, second user engagement data 110 may be stored in user database 126. In some embodiments, processor 102 may retrieve second user engagement data 110 from user database 126. In some embodiments, user may manually input second user engagement data 110.

With continued reference to FIG. 1, memory 104 contains instructions configuring processor 102 to update action data 128 as a function of second user engagement data 110. Updating action data 128 includes updating action training data 146 as a function of second user engagement data 110 and retraining an action machine-learning model 148 as a function of the updated action training data 146. Updating action training data 146 is further described above. In some embodiments, updating action data 128 may include identifying a second negative engagement datum 154 from second user engagement data 110 as a function of at least an attribute 132 of the second user engagement data 110, classifying the second negative engagement datum 154 into at least an engagement label 130 and updating action data 128 as a function of a distance metric measuring the second negative engagement datum 154 against negative engagement datum 120 in the at least an engagement label 130. For the purposes of this disclosure, a "second negative engagement datum" is a data element related to second user engagement data that indicates dissatisfaction, criticism, or disapproval of a product, service, or experience. In some embodiments, second negative engagement datum 154 may be consistent with negative engagement datum 120 in this disclosure.

With continued reference to FIG. 1, a "distance metric," as used in this disclosure, is a quantitative value indicating a degree of similarity of a set of data values to another set of data values. For instance, and without limitation, second negative engagement datum 154 and negative engagement datum 120 may be represented a vector. Each vector may be represented, without limitation, as an n-tuple of values, where n is at least two values. Each value of n-tuple of values may represent a measurement or other quantitative value associated with a given category of data, or attribute, such as a nutrients, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. A non-limiting distance metric may include a degree of vector similarity. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting illustration, negative engagement datum 120 or positive engagement datum, and/or one or more subsets thereof, may be represented using a vector or other data structure, and second negative engagement datum 154 may be represented by a like data structure, such as another vector; a distance metric comparing the two data structures may then be calculated and compared to distance metrics calculations to find a minimal distance metric calculation and/or a set of minimal distance metric calculations. For the purposes of this disclosure, a "positive engagement datum" is a data element related to user interactions or feedback that indicates satisfaction, approval, or favorable experiences with a product, service, or process. In some embodiments, processor 102 may identify positive engagement datum from user engagement data (first user engagement data 108 and second user engagement data 110). In some embodiments, processor 102 may retrieve positive engagement datum from user database 126. In some embodiments, user may manually input positive engagement datum. A set of minimal distance metric calculations may be a set of distance metric calculations less than a preconfigured threshold distance from data structure representing positive engagement datum or negative engagement datum 120. Preconfigured threshold may be set by one or more expert users and/or determined statistically, for instance by finding a top quartile and/or number of percentiles of proximity in a series of distance metric determinations over time for user, at one time for a plurality of users, and/or over time for a plurality of users. Plurality of users may include a plurality of users selected by a cohort classifier, which may classify user to a plurality of users having similar attributes.

With continued reference to FIG. 1, distance metric may be performed using a loss function analysis. In an embodiment, processor 102 may compare second negative engagement datum 154 to a mathematical expression representing positive engagement datum or negative engagement datum 120. Mathematical expression may include a linear combination of variables, weighted by coefficients representing relative importance of each negative engagement criterion. For instance, a variable such as dissatisfaction with product quality, or the importance a user places on the reliability of the product versus aesthetic design, may be multiplied by a first coefficient representing the significance of product reliability in contributing to negative engagement datum 120. A second user input, such as frustration with the overall cost, may be multiplied by a second coefficient representing the weight of cost concerns in driving negative engagement. A degree of deviation from expected performance standards or user experience guidelines may be represented as another parameter, which may be multiplied by another coefficient representing the importance of that deviation in generating negative feedback. Additionally, a degree of dissatisfaction due to delayed customer service response times may be multiplied by an additional coefficient representing the importance of that issue in the context of negative engagement. Persons skilled in the art, upon reviewing the entirety of this disclosure, will recognize different variables that may be weighted by various coefficients. The use of a linear combination is provided only as an illustrative example; other mathematical expressions may alternatively or additionally be used, including without limitation higher-order polynomial expressions or the like.

With continued reference to FIG. 1, the mathematical expression may represent a loss function, where a "loss function" is an expression whose output an optimization algorithm seeks to minimize in order to generate an optimal result. As a non-limiting example, processor 102 may calculate variables related to a set of user dissatisfaction parameters and/or the variance of such parameters from expected service standards. The computing device may then calculate an output of the mathematical expression using these variables and select a candidate resolution strategy that produces an output with the smallest magnitude, according to a given definition of "magnitude," from the set of outputs representing each of a plurality of candidate resolution strategies. Magnitude may, for instance, include absolute value, numerical size, or the like. The selection of different loss functions may result in the identification of different resolution strategies as generating minimal outputs; for instance, where product quality issues are associated in a first loss function with a large coefficient or weight, a resolution strategy focusing on addressing quality concerns may minimize the first loss function. In contrast, a second loss function, where cost concerns have a larger coefficient and product quality issues have a smaller coefficient, may produce a minimal output for a different resolution strategy that more closely addresses cost-related dissatisfaction.

Alternatively or additionally, and with continued reference to FIG. 1, each candidate resolution strategy may be represented by a mathematical expression having the same form as the primary mathematical expression; processor 102 may compare the former to the latter using an error function that represents the average difference between the two mathematical expressions. The error function may, as a non-limiting example, be calculated using the average difference between coefficients corresponding to each parameter related to user dissatisfaction. A candidate resolution strategy having a mathematical expression that minimizes the error function may be selected, as it represents an optimal expression of the relative importance of the factors contributing to negative engagement within the system or for the user. In an embodiment, error function and loss function calculations may be combined; for instance, a candidate resolution strategy resulting in a minimal aggregate expression of both the error function and loss function—such as through simple addition, arithmetic mean, or a similar combination—may be selected. This selection would correspond to an option that minimizes total variance from user expectations while simultaneously addressing the most critical factors that contribute to negative feedback. Coefficients of the mathematical expression and/or loss function may be scaled and/or normalized, allowing comparison and/or error function calculation to be performed without distortion caused by varied absolute quantities of numbers.

In an embodiment, and further referring to FIG. 1, neutral factors—those that neither contribute significantly to negative nor positive engagement—may be excluded from data structures used in distance metric calculations as described in this disclosure. A "neutral factor" in this context refers to an element of the user experience that has not been determined to have a measurable negative or positive impact on user satisfaction, such as minor aesthetic preferences or secondary features. In an embodiment, apparatus 100 may not map neutral factors to critical engagement metrics. Alternatively or additionally, a factor having no measurable impact on user satisfaction, referred to in this disclosure as a "neutral factor," may be excluded from distance metric calculations. As a non-limiting example, two user experiences differing only by neutral factors may thus be treated by apparatus 100 as equivalent in terms of engagement.

Alternatively or additionally, graphical user interface 116 may utilize a combination of negative and/or neutral engagement data, which may be weighted, to rank the severity or impact of negative engagement across a plurality of user interactions. For instance, graphical user interface 116 may rank a given user complaint by computing a weight corresponding to the frequency of similar complaints, a weight corresponding to the overall impact of the issue, and a weight corresponding to the deviation from expected service standards, and multiplying one or more weighting factors by a base ranking and/or by each other. Weighting factors may be based on user preferences or organizational priorities, which may, for instance, be entered as described in further detail below. The above methods may be combined; for instance, a distance metric may be computed first with regard to negative engagement data only, creating a variable that is then used with one coefficient in a loss function and/or with one weighting factor in a weighted ranking process to produce a prioritization of issues incorporating additional contextual data.

With continued reference to FIG. 1, attributes used in distance metric, loss functions, weightings, or the like may be normalized across geographical regions (geographical data), time periods, or the like. A geographical region may be defined from a boundary of a city, county, state, country, and so on. Alternatively, a geographical region may be defined from a geo-fence around a user.

Figure 2:
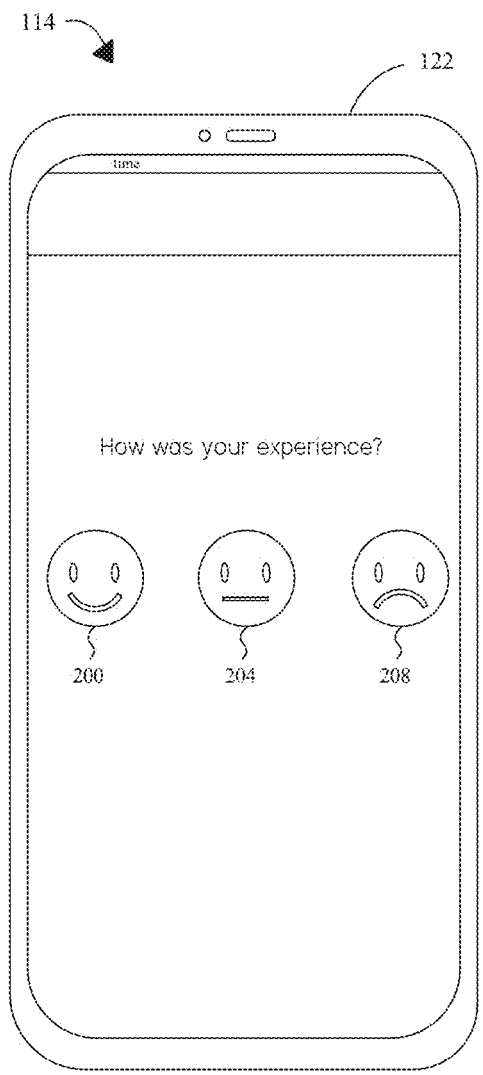
FIG. 2 illustrates an exemplary user interface displaying graphical user interface elements on a user device.

Referring now to FIG. 2, an exemplary user interface 114 displaying graphical user interface (GUI) elements for inputting first user engagement data 108 is illustrated. For the purposes of this disclosure, "graphical user interface elements" are the visual components within a software application or operating system that allow users to interact with the system in an intuitive and visually engaging manner. As shown in FIG. 2, in a non-limiting example, graphical user interface elements may include smiley face element 200, neutral face element 204 and angry face element 208. For instance, the smiley face element 200 might be used to indicate a positive reaction or satisfaction, the neutral face element 204 could represent a neutral or indifferent response, and the angry face element 208 might signify dissatisfaction or a negative experience. User may interact with these graphical user interface elements to input first user engagement data 108 or second user engagement data 110. In some embodiments, processor 102 may consider first user engagement data 108 received through the angry face element 208 as negative engagement datum 120. This means that when a user interacts with the angry face element 208, indicating dissatisfaction or a negative reaction, the processor 102 may categorize this input as a negative engagement datum 120. In a non-limiting example, user may manually input first user engagement data 108 through user interface 114. For example, and without limitation, user may input negative feedback (negative engagement datum 120) by pushing a red button (user interface 114). In another non-limiting example, user may manually input first user engagement data 108 by clicking an angry face graphical user interface (GUI) element on a screen at point-on-sale (user interface 114).

Figure 3:
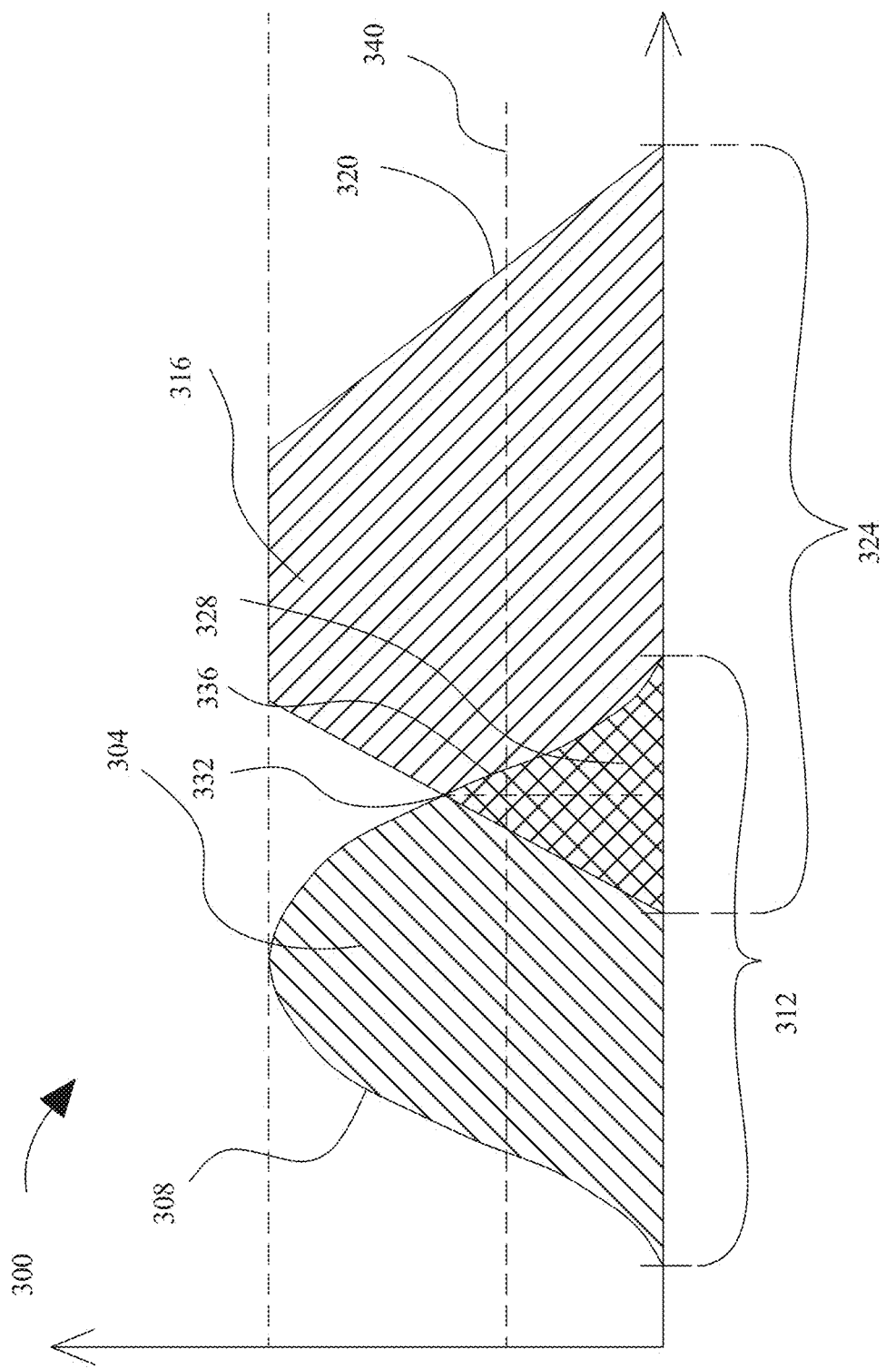
FIG. 3 illustrates an exemplary embodiment of fuzzy set comparison.

Referring to FIG. 3, an exemplary embodiment of fuzzy set comparison 300 is illustrated. A first fuzzy set 304 may be represented, without limitation, according to a first membership function 308 representing a probability that an input falling on a first range of values 312 is a member of the first fuzzy set 304, where the first membership function 308 has values on a range of probabilities such as without limitation the interval [0,1], and an area beneath the first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 3, first fuzzy set 304 may represent any value or combination of values as described above, including output from one or more machine-learning models, first user engagement data, and a predetermined class, such as without limitation of engagement label. A second fuzzy set 316, which may represent any value which may be represented by first fuzzy set 304, may be defined by a second membership function 320 on a second range 324; second range 324 may be identical and/or overlap with first range 312 and/or may be combined with first range via Cartesian product or the like to generate a mapping permitting evaluation overlap of first fuzzy set 304 and second fuzzy set 316. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between an output from one or more machine-learning models and a predetermined class, such as without limitation engagement label categorization, for combination to occur as described above. Alternatively or additionally, each threshold may be tuned by a machine-learning and/or statistical process, for instance and without limitation as described in further detail below.

Further referring to FIG. 3, in an embodiment, a degree of match between fuzzy sets may be used to classify first user engagement data with engagement label. For instance, if an engagement label has a fuzzy set matching first user engagement data fuzzy set by having a degree of overlap exceeding a threshold, processor 102 may classify first user engagement data as belonging to engagement label categorization. Where multiple fuzzy matches are performed, degrees of match for each respective fuzzy set may be computed and aggregated through, for instance, addition, averaging, or the like, to determine an overall degree of match.

With continued reference to FIG. 3, in an embodiment, first user engagement data may be compared to multiple engagement label categorization fuzzy sets. For instance, first user engagement data may be represented by a fuzzy set that is compared to each of the multiple engagement label categorization fuzzy sets; and a degree of overlap exceeding a threshold between first user engagement data fuzzy set and any of the multiple engagement label categorization fuzzy sets may cause processor 102 to classify first user engagement data as belonging to engagement label categorization. For instance, in one embodiment there may be two engagement label categorization fuzzy sets, representing respectively high engagement label categorization and low engagement label categorization. First engagement label categorization may have a first fuzzy set; Second engagement label categorization may have a second fuzzy set; and first user engagement data may have first user engagement data fuzzy set, processor 102, for example, may compare first user engagement data fuzzy set with each of engagement label categorization fuzzy set and in engagement label categorization fuzzy set, as described above, and classify first user engagement data to either, both, or neither of engagement label categorization or in engagement label categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, first user engagement data may be used indirectly to determine a fuzzy set, as first user engagement data fuzzy set may be derived from outputs of one or more machine-learning models that take first user engagement data directly or indirectly as inputs.

With continued reference to FIG. 3, a computing device may use a logic comparison program, such as, but not limited to, a fuzzy logic model to determine a engagement label response. An engagement label response may include, but is not limited to, critical, high negativity, medium negativity, low negativity, and the like; each such engagement label response may be represented as a value for a linguistic variable representing engagement label response or in other words a fuzzy set as described above that corresponds to a degree of negativity as calculated using any statistical, machine-learning, or other method that may occur to a person skilled in the art upon reviewing the entirety of this disclosure. In other words, a given element of first user engagement data may have a first non-zero value for membership in a first linguistic variable value such as "high negativity" and a second non-zero value for membership in a second linguistic variable value such as "low negativity" In some embodiments, determining an engagement label categorization may include using a linear regression model. A linear regression model may include a machine-learning model. A linear regression model may be configured to map data of first user engagement data, such as degree of negativity to one or more engagement label parameters. A linear regression model may be trained using a machine-learning process. A linear regression model may map statistics such as, but not limited to, quality of first user engagement data negativity. In some embodiments, determining an engagement label of first user engagement data may include using an engagement label classification model. A engagement label classification model may be configured to input collected data and cluster data to a centroid based on, but not limited to, frequency of appearance, linguistic indicators of quality, and the like. Centroids may include scores assigned to them such that quality of negativity of first user engagement data may each be assigned a score. In some embodiments engagement label classification model may include a K-means clustering model. In some embodiments, engagement label classification model may include a particle swarm optimization model. In some embodiments, determining engagement label of first user engagement data may include using a fuzzy inference engine. A fuzzy inference engine may be configured to map one or more first user engagement data elements using fuzzy logic. In some embodiments, first user engagement data may be arranged by a logic comparison program into engagement label arrangement. An "engagement label arrangement" as used in this disclosure is any grouping of objects and/or data based on skill level and/or output score. This step may be implemented as described above. Membership function coefficients and/or constants as described above may be tuned according to classification and/or clustering algorithms. For instance, and without limitation, a clustering algorithm may determine a Gaussian or other distribution of questions about a centroid corresponding to a given negativity level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 3, an inference engine may be implemented according to input and/or output membership functions and/or linguistic variables. For instance, a first linguistic variable may represent a first measurable value pertaining to first user engagement data, such as a degree of negativity of an element, while a second membership function may indicate a degree of in engagement label of a subject thereof, or another measurable value pertaining to first user engagement data. Continuing the example, an output linguistic variable may represent, without limitation, a score value. An inference engine may combine rules, such as: "if the negativity level is 'high,' the negativity score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 3, first user engagement data to be used may be selected by user selection, and/or by selection of a distribution of output scores, such as 30% high priority, 40% medium priority, and 30% low priority, or the like. Each engagement label categorization may be selected using an additional function such as in engagement label as described above.

Figure 4:
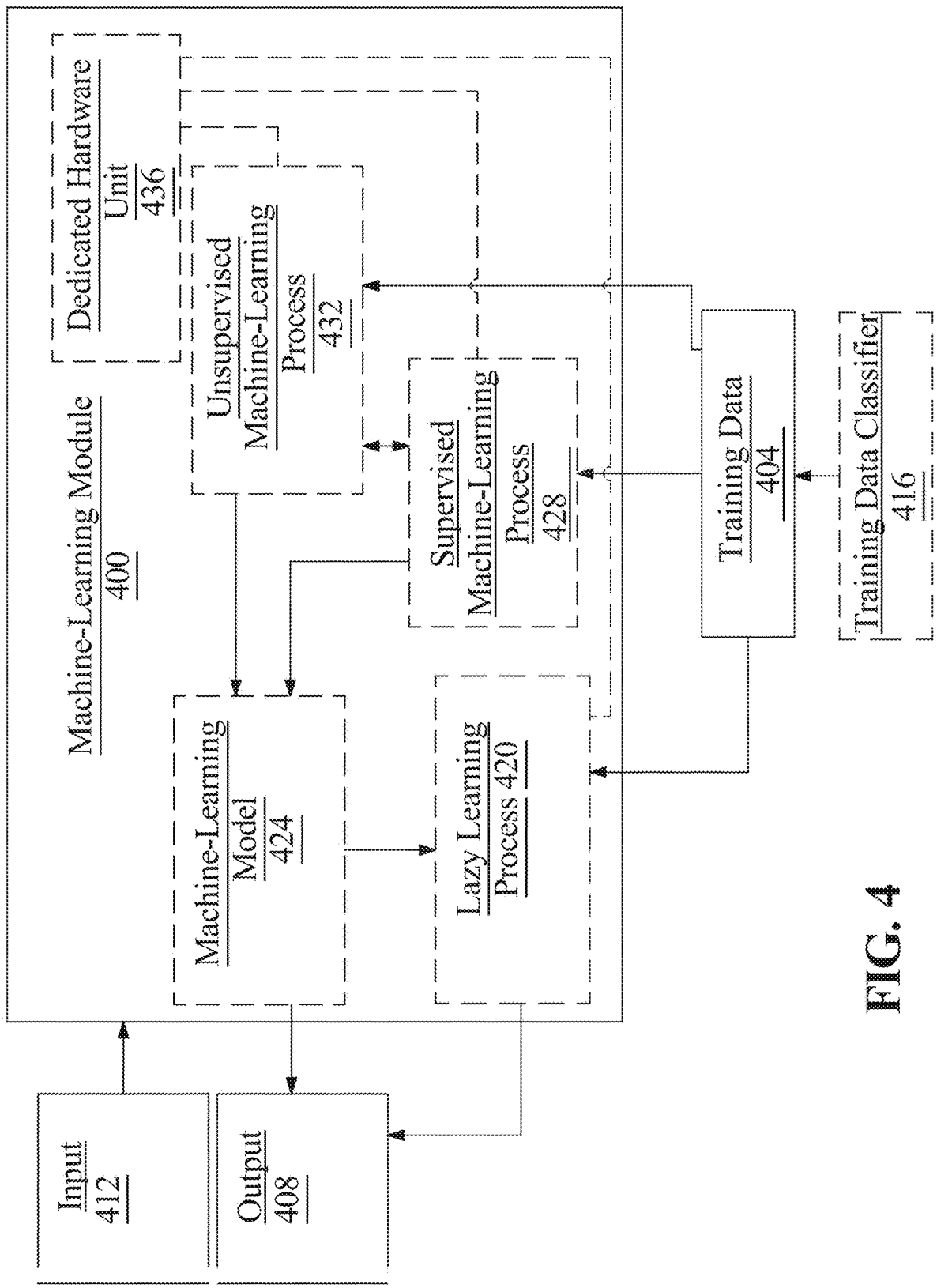
FIG. 4 illustrates a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

With continued reference to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include first user engagement data, negative engagement datum, engagement label, action data, action training data, input and output of action machine-learning model, second user engagement data, attribute, user device identifier, geolocation, group training data, input and output of group classifier, action item, executer datum, second negative engagement datum, and the like. As a non-limiting illustrative example, output data may include first user engagement data, negative engagement datum, engagement label, action data, action training data, input and output of action machine-learning model, second user engagement data, attribute, user device identifier, geolocation, group training data, input and output of group classifier, action item, executer datum, second negative engagement datum, and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to user cohort, engagement label, and the like. The user cohort may be related to users' age, gender, position, location, experience, and the like.

With continued reference to FIG. 4, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum\nolimits_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

With continued reference to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

With continued reference to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include first user engagement data, negative engagement datum, engagement label, action data, action training data, input and output of action machine-learning model, second user engagement data, attribute, user device identifier, geolocation, group training data, input and output of group classifier, action item, executer datum, second negative engagement datum, and the like as described above as inputs, first user engagement data, negative engagement datum, engagement label, action data, action training data, input and output of action machine-learning model, second user engagement data, attribute, user device identifier, geolocation, group training data, input and output of group classifier, action item, executer datum, second negative engagement datum, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

With continued reference to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

With continued reference to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user engagement or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
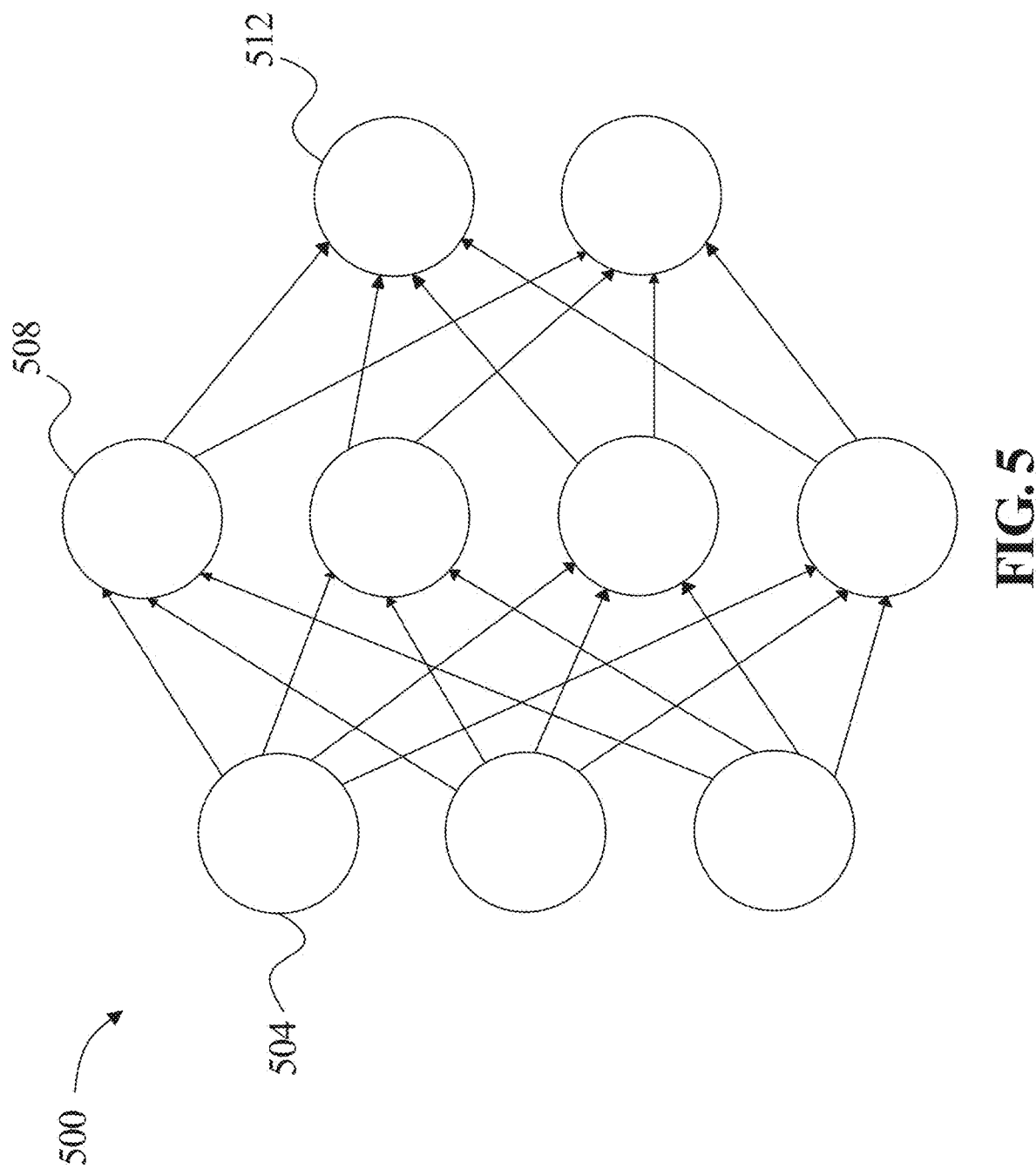
FIG. 5 illustrates a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
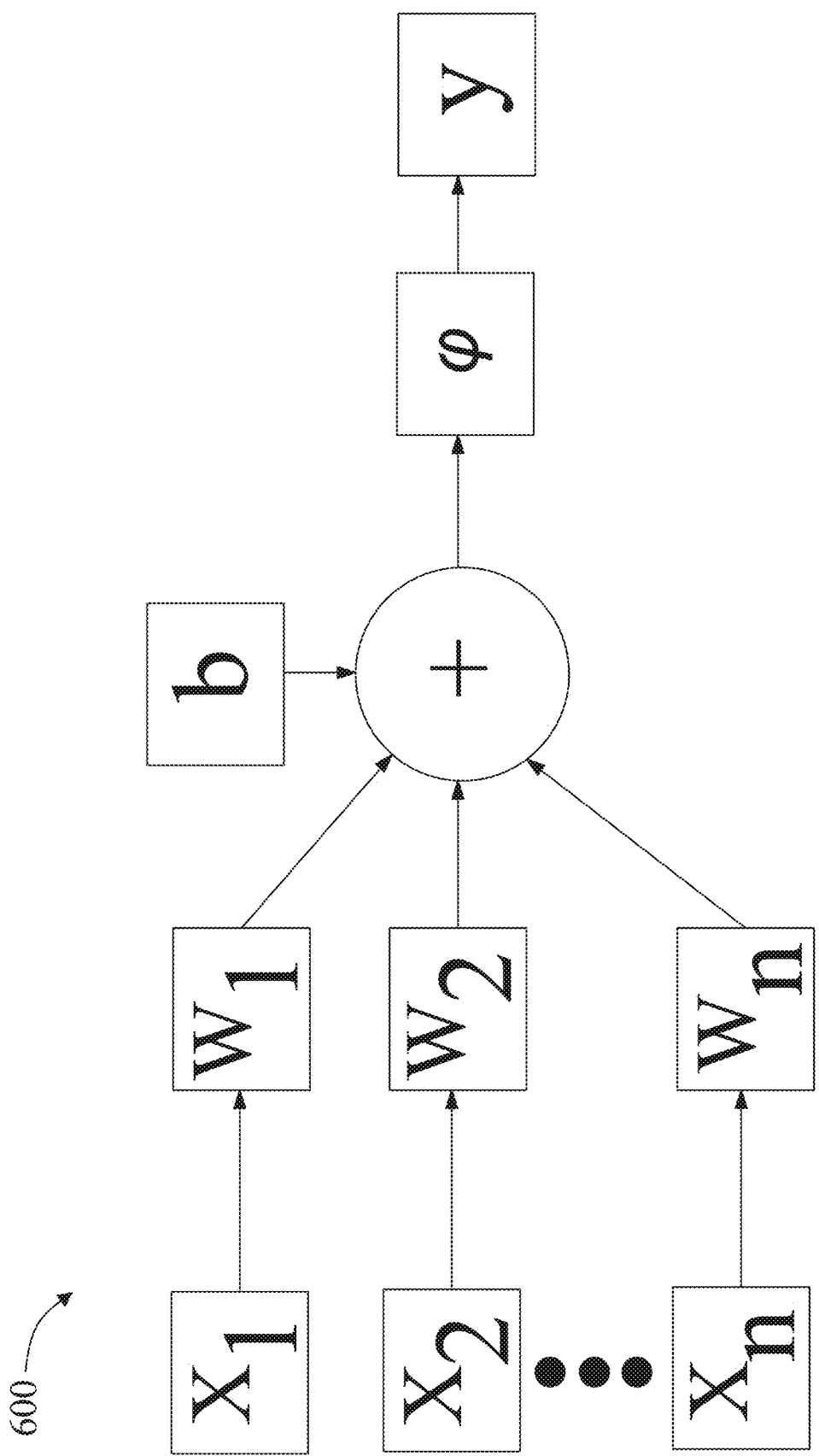
FIG. 6 illustrates a block diagram of an exemplary node in a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
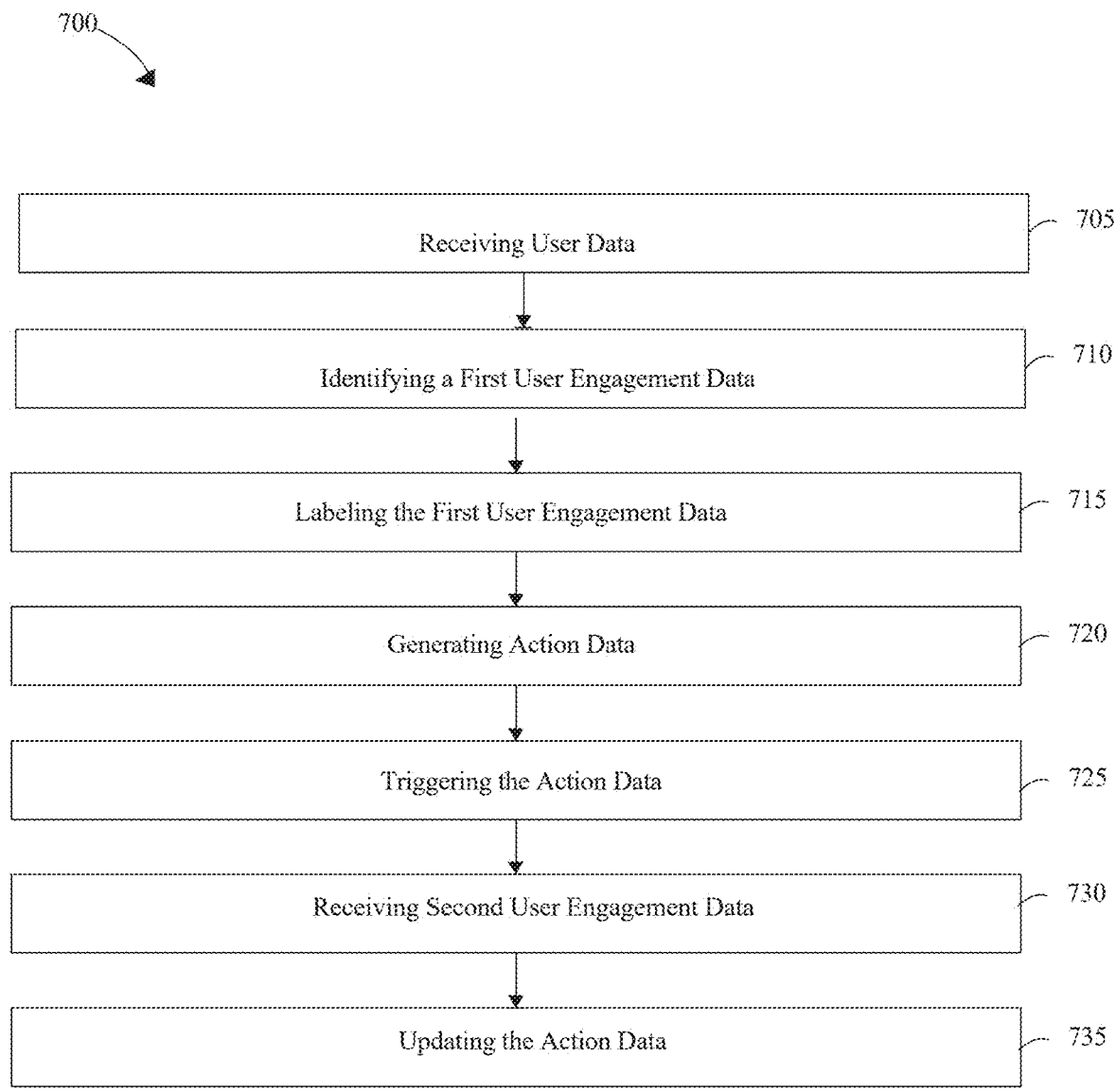
FIG. 7 illustrates a flow diagram of an exemplary method for data generation for user engagement.

Referring now to FIG. 7, a flow diagram of an exemplary method 700 for data generation for user engagement is illustrated. Method 700 contains a step 705 of receiving, using at least a processor, user data from an interactive user interface. In some embodiments, the interactive user interface may include an add-on feature. This may be implemented as reference to FIGS. 1-6.

With continued reference to FIG. 7, method 700 contains a step 710 of identifying, using at least a processor, a first user engagement data as a function of user data. In some embodiments, identifying the first user engagement data may include extracting at least an attribute of the user data and identifying the first user engagement data as a function of the at least an attribute. These may be implemented as reference to FIGS. 1-6.

With continued reference to FIG. 7, method 700 contains a step 715 of labeling, using at least a processor, first user engagement data to at least an engagement label. In some embodiments, labeling the first user engagement data may include extracting a user device identifier of the first user engagement data and labeling the first user engagement data to the at least an engagement label as a function of the user device identifier. In some embodiments, labeling the first user engagement data may include identifying a geofence of the first user engagement data and labeling the first user engagement data to the at least an engagement label as a function of the geolocation. In some embodiments, labeling the first user engagement data may include generating group training data, wherein the group training data may include exemplary negative engagement data correlated to exemplary engagement labels, training a group classifier using the group training data and labeling the first user engagement data using the trained group classifier. These may be implemented as reference to FIGS. 1-6.

With continued reference to FIG. 7, method 700 contains a step 720 of generating, using at least a processor, action data as a function of a negative engagement datum containing at least an engagement label, wherein determining the action data includes generating action training data, wherein the action training data includes exemplary negative engagement data correlated to exemplary action data, training an action machine-learning model using the action training data and generating the action data using the trained action machine-learning model. In some embodiments, generating the action data may include generating a list of action items as a function of a keyword of the action data. In some embodiments, generating the list of action items may include determining a priority level of each action item of the list of action items as a function of an urgency of the negative engagement datum. These may be implemented as reference to FIGS. 1-6.

With continued reference to FIG. 7, method 700 contains a step 725 of triggering, using at least a processor, action data using an application processing interface (API). In some embodiments, triggering the action data may include triggering different modules of the interactive user interface based on at least an engagement label using API. These may be implemented as reference to FIGS. 1-6.

With continued reference to FIG. 7, method 700 contains a step 730 of receiving, using at least a processor, second user engagement data as a function of triggered action data from an interactive user interface. This may be implemented as reference to FIGS. 1-6.

With continued reference to FIG. 7, method 700 contains a step 735 of updating, using at least a processor, action data as a function of second user engagement data, wherein updating the action data includes updating the action training data as a function of the second user engagement data and retraining the action machine-learning model as a function of the updated action training data. In some embodiments, updating the action data may include labeling the second engagement data into the at least an engagement label and updating the action data as a function of a distance metric measuring the second negative engagement datum against the negative engagement datum containing the at least an engagement label. These may be implemented as reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
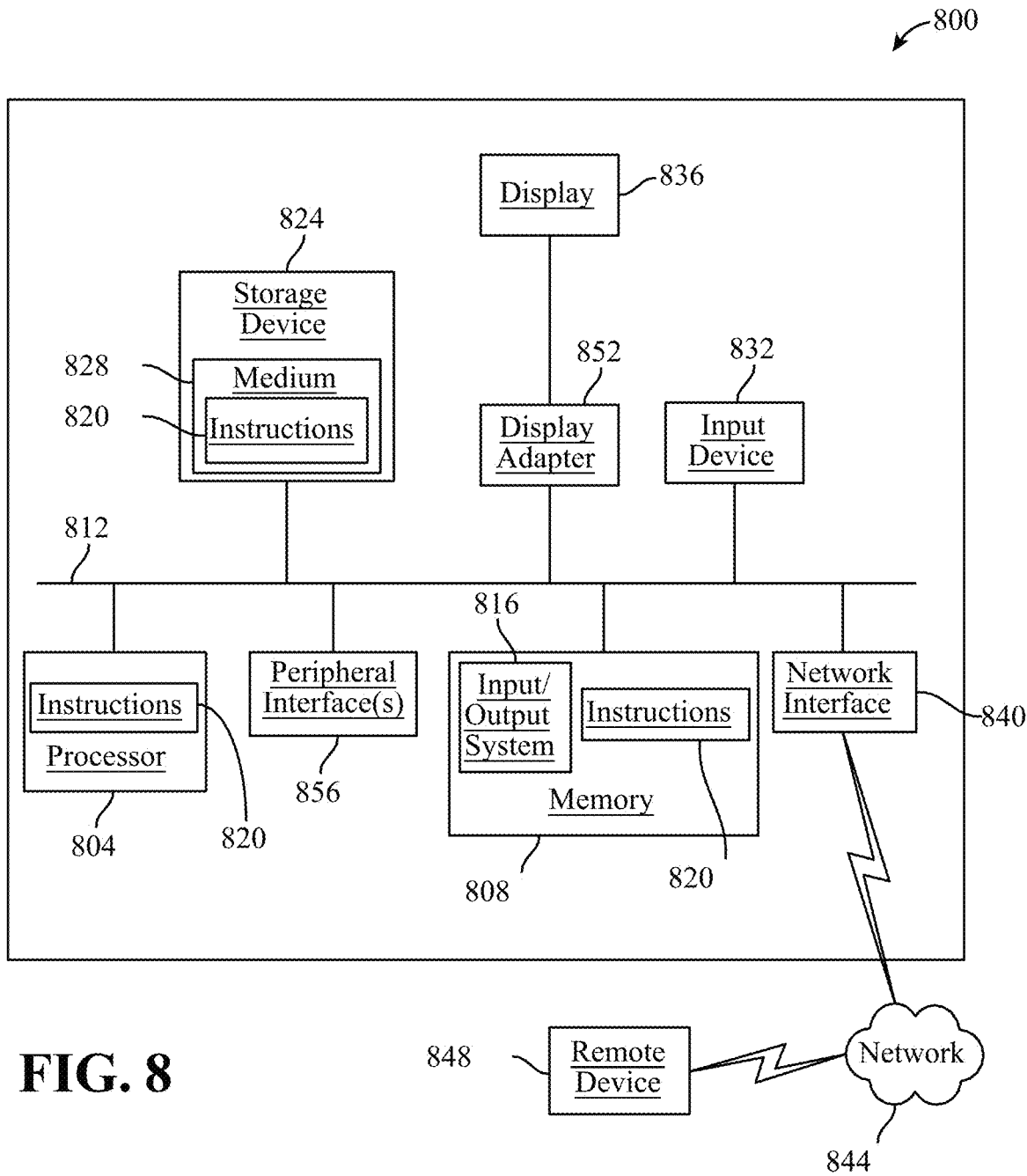
FIG. 8 illustrates a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and memory 808 that communicate with each other, and with other components, via a bus 812.

Bus 812 may include any of several types of bus structures including, but not limited to, memory bus, memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for data generation for user engagement, the apparatus comprising:
   an application programming interface (API);
   an interactive user interface;
   at least a processor; and
   a memory communicatively connected to the at least a processor, wherein the memory contains instructions configuring the at least a processor to:
   receive user data from the interactive user interface;
   identify a first user engagement data as a function of the user data, wherein identifying the first user engagement data comprises converting at least a portion of the first user engagement data into machine-encoded text by at least an optical character recognition (OCR) process, wherein converting the at least a portion of the first user engagement data into the machine-encoded text comprises converting images of text in the at least a portion of the first user engagement data into the machine-encoded text and further comprises:
   pre-processing image components of the images by de-skewing at least one of the image components by applying a transform operation to the at least one of the image components;
   implementing an OCR algorithm comprising a matrix matching process by comparing pixels of at least one of the pre-processed images to pixels of a stored glyph on a pixel-by-pixel basis; and
   post-processing an output of the matrix matching process to increase OCR accuracy by constraining the output to a lexicon containing a set of words whose occurrence is permitted;
   label the first user engagement data, including the at least a portion of the first user engagement data converted into the machine-encoded text by the at least an OCR process, to at least an engagement label, wherein labeling the first user engagement data comprises:
   extracting a user device identifier of the first user engagement data, wherein the user device identifier includes at least a cryptographic hash; and
   labeling the first user engagement data to the at least an engagement label as a function of the user device identifier;
   generate action data as a function of the first user engagement data containing the at least an engagement label, wherein generating the action data utilizes an action machine-learning model and comprises:
   receiving action training data, wherein the action training data comprises exemplary first user engagement data correlated to exemplary action data;
   sanitizing the action training data using a dedicated hardware unit comprising circuitry configured to perform signal processing operations, wherein sanitizing the action training data comprises:

determining by the dedicated hardware unit that a training data entry of the action training data has a signal to noise ratio below a threshold value; and removing the training data entry from the action training data to create sanitized action training data;

training, iteratively, the action machine-learning model using the sanitized action training data; and generating the action data using the trained action machine-learning model;

trigger the action data using the API;

receive second user engagement data as a function of the triggered action data from the interactive user interface; and update the action data as a function of the second user engagement data, wherein updating the action data comprises:

updating the sanitized action training data as a function of the second user engagement data; and retraining the action machine-learning model as a function of the updated sanitized action training data.

2. The apparatus of claim 1, wherein the interactive user interface comprises an add-on feature.

3. The apparatus of claim 1, wherein identifying the first user engagement data comprises:

extracting at least an attribute of the user data; and identifying the first user engagement data as a function of the at least an attribute.

4. The apparatus of claim 1, wherein labeling the first user engagement data comprises:

identifying a geofence as a function of the first user engagement data; and labeling the first user engagement data to the at least an engagement label as a function of the geofence.

5. The apparatus of claim 1, wherein labeling the first user engagement data comprises:

generating group training data, wherein the group training data comprises exemplary user engagement data correlated to exemplary engagement labels;

training a group classifier using the group training data; and labeling the first user engagement data using the trained group classifier.

6. The apparatus of claim 1, wherein generating the action data comprises generating a list of action items as a function of a keyword of the action data.

7. The apparatus of claim 6, wherein generating the list of action items comprises determining a priority level of each action item of the list of action items as a function of an urgency of the first user engagement data.

8. The apparatus of claim 1, wherein triggering the action data comprises triggering different modules of the interactive user interface based on the at least an engagement label using the API.

9. The apparatus of claim 1, wherein updating the action data comprises:

labeling the second first user engagement data to the at least an engagement label; and updating the action data as a function of a distance metric measuring the second user engagement data against the first user engagement data containing the at least an engagement label.

10. A method for data generation for user engagement, the method comprising:

receiving, using at least a processor, user data from an interactive user interface;

identifying, using the at least a processor, a first user engagement data as a function of the user data, wherein identifying the first user engagement data comprises converting at least a portion of the first user engagement data into machine-encoded text by at least an optical character recognition (OCR) process, wherein converting the at least a portion of the first user engagement data into the machine-encoded text comprises converting images of text in the at least a portion of the first user engagement data into the machine-encoded text and further comprises:

pre-processing image components of the images by de-skewing at least one of the image components by applying a transform operation to the at least one of the image components;

implementing an OCR algorithm comprising a matrix matching process by comparing pixels of at least one of the pre-processed images to pixels of a stored glyph on a pixel-by-pixel basis; and post-processing an output of the matrix matching process to increase OCR accuracy by constraining the output to a lexicon containing a set of words whose occurrence is permitted;

labeling, using the at least a processor, the first user engagement data, including the at least a portion of the first user engagement data converted into the machine-encoded text by the at least an OCR process, to at least an engagement label, wherein labeling the first user engagement data comprises:

extracting a user device identifier of the first user engagement data, wherein the user device identifier includes at least a cryptographic hash; and labeling the first user engagement data to the at least an engagement label as a function of the user device identifier;

generating, using the at least a processor, action data as a function of the first user engagement data containing the at least an engagement label, wherein generating the action data utilizes an action machine-learning model and comprises:

receiving action training data, wherein the action training data comprises exemplary first user engagement data correlated to exemplary action data;

sanitizing the action training data using a dedicated hardware unit comprising circuitry configured to perform signal processing operations, wherein sanitizing the action training data comprises:

determining by the dedicated hardware unit that a training data entry of the action training data has a signal to noise ratio below a threshold value; and removing the training data entry from the action training data to create sanitized action training data;

training, iteratively, the action machine-learning model training an action machine-learning model using the sanitized action training data; and generating the action data using the trained action machine-learning model;

triggering, using the at least a processor, the action data using an application processing interface (API);

receiving, using the at least a processor, second user engagement data as a function of the triggered action data from the interactive user interface; and updating, using the at least a processor, the action data as a function of the second user engagement data, wherein updating the action data comprises:
  updating the sanitized action training data as a function of the second user engagement data; and
  retraining the action machine-learning model as a function of the updated sanitized action training data.

11. The method of claim 10, wherein the interactive user interface comprises an add-on feature.

12. The method of claim 10, wherein identifying the first user engagement data comprises:
  extracting at least an attribute of the user data; and
  identifying the first user engagement data as a function of the at least an attribute.

13. The method of claim 10, wherein labeling the first user engagement data comprises:
  identifying a geofence as a function of the first user engagement data; and
  labeling the first user engagement data to the at least an engagement label as a function of the geofence.

14. The method of claim 10, wherein labeling the first user engagement data comprises:
  generating group training data, wherein the group training data comprises exemplary user engagement data correlated to exemplary engagement labels;
  training a group classifier using the group training data; and
  labeling the first user engagement data using the trained group classifier.

15. The method of claim 10, wherein generating the action data comprises generating a list of action items as a function of a keyword of the action data.

16. The method of claim 15, wherein generating the list of action items comprises determining a priority level of each action item of the list of action items as a function of an urgency of the first user engagement data.

17. The method of claim 10, wherein triggering the action data comprises triggering different modules of the interactive user interface based on the at least an engagement label using the API.

18. The method of claim 10, wherein updating the action data comprises:
  labeling the second user engagement data to the at least an engagement label; and
  updating the action data as a function of a distance metric measuring the second user engagement data against the first user engagement data containing the at least an engagement label.

* * * * *